United States Patent
Sebire et al.

(10) Patent No.: US 7,924,770 B2
(45) Date of Patent: Apr. 12, 2011

(54) METHOD OF CONTROLLING COMMUNICATION BETWEEN TWO NODES IN A COMMUNICATION SYSTEM

(75) Inventors: Benoist Sebire, Tokyo (JP); Zhuyan Zhao, Beijing (CN)

(73) Assignee: Nokia Corporation, Espoo (FI)

( * ) Notice: Subject to any disclaimer, the term of this patent is extended or adjusted under 35 U.S.C. 154(b) by 1785 days.

(21) Appl. No.: 10/984,848

(22) Filed: Nov. 10, 2004

(65) Prior Publication Data

US 2006/0031563 A1 Feb. 9, 2006

Related U.S. Application Data

(60) Provisional application No. 60/599,044, filed on Aug. 6, 2004.

(51) Int. Cl.
*H04W 4/00* (2009.01)
*H04B 7/00* (2006.01)

(52) U.S. Cl. ............... 370/328; 455/69; 455/422.1
(58) Field of Classification Search ............... None
See application file for complete search history.

(56) References Cited

U.S. PATENT DOCUMENTS

| | | | |
|---|---|---|---|
| 6,654,922 B1* | 11/2003 | Numminen et al. | 714/748 |
| 2002/0077113 A1* | 6/2002 | Spaling et al. | 455/453 |
| 2002/0097695 A1* | 7/2002 | Herrmann | 370/329 |
| 2002/0128035 A1* | 9/2002 | Jokinen et al. | 455/552 |
| 2002/0191578 A1* | 12/2002 | Bachl et al. | 370/342 |
| 2003/0036403 A1* | 2/2003 | Shiu et al. | 455/522 |
| 2003/0123415 A1* | 7/2003 | Bysted et al. | 370/337 |
| 2003/0185193 A1* | 10/2003 | Choi et al. | 370/348 |
| 2003/0232624 A1* | 12/2003 | Toskala et al. | 455/509 |
| 2005/0036449 A1* | 2/2005 | Ranta-Aho et al. | 370/235 |
| 2005/0043034 A1* | 2/2005 | Abdel-Ghaffar et al. | 455/453 |
| 2005/0044130 A1* | 2/2005 | Sillasto et al. | 709/200 |
| 2005/0048975 A1* | 3/2005 | Ranta-Aho et al. | 455/438 |
| 2005/0094656 A1* | 5/2005 | Rao et al. | 370/431 |
| 2005/0141560 A1* | 6/2005 | Muthiah | 370/474 |
| 2005/0163056 A1* | 7/2005 | Ranta-Aho et al. | 370/252 |
| 2005/0169215 A1* | 8/2005 | Cheng et al. | 370/335 |
| 2005/0249133 A1* | 11/2005 | Terry et al. | 370/278 |
| 2005/0276248 A1* | 12/2005 | Butala et al. | 370/332 |
| 2005/0276258 A1* | 12/2005 | Gu | 370/349 |
| 2006/0023628 A1* | 2/2006 | Uehara et al. | 370/232 |
| 2006/0166664 A1* | 7/2006 | Livet et al. | 455/422.1 |
| 2006/0234741 A1* | 10/2006 | Provvedi | 455/513 |

OTHER PUBLICATIONS

3GPP TR 25.896 V1.1.2, "3$^{rd}$ Generation Partnership Project; Technical Specification Group Radio Access Network; Feasibility Study for Enhanced Uplink for UTRA FDD", Dec. 2003, pp. 1-115.

* cited by examiner

*Primary Examiner* — Ricky Ngo
*Assistant Examiner* — Clemence Han
(74) *Attorney, Agent, or Firm* — Squire, Sanders & Dempsey (US) LLP

(57) ABSTRACT

This invention relates to a method of controlling communication between two nodes in a communication system. The method includes the steps of providing a set of values for controlling communication between the two nodes. The method also includes providing information relating to traffic conditions and providing a command for controlling communication. The method further includes selecting one of the set of values in dependence on the provided information. The command and mapping information provides a mapping between the traffic condition information and information relating to the values.

29 Claims, 3 Drawing Sheets

METHOD OF CONTROLLING COMMUNICATION BETWEEN TWO NODES IN A COMMUNICATION SYSTEM

BACKGROUND TO THE INVENTION

1. Field of the Invention

The present invention relates to a method of controlling communication between two nodes in a communication system and in particular, but not exclusively to controlling the data rate used in an enhanced dedicated channel in a UMTS system.

2. Description of the Related Art

A mobile communication system is an example of a system in which an access network is provided to allow access to the system functionality for user terminals.

In a universal mobile telecommunication system (UMTS), a radio access network typically provides access for user equipment to a mobile communications system core network. The user equipment typically communicates with the access network over a radio interface, the access network including a plurality of Node Bs or base transceiver stations with which the user equipment establishes a connection. Each of the Node Bs is connected to one or more radio network controllers.

A dedicated channel (DCH) is provided in a UMTS system for uplink traffic from the user equipment to the radio network controller via the Node B. In the third generation partnership project, technical specification group radio access network (3GPP TSG-RAN) there has been proposed high speed uplink packet access, also known in 3GPP as frequency division duplex (FDD) enhanced uplink, including an enhanced DCH, E-DCH. This proposal is documented in 3GPP TR 25.896.

Currently, it is proposed to distribute some of the packet scheduler functionalities of the radio network controller to the Node Bs. This is to provide faster scheduling of bursty non real time traffic than the layer 3 in the RNC radio network controller facilitates. The idea is that with faster link adaptation, it is possible to more efficiently share the up link power resource between packet data users. When packets have been transmitted from one user, the scheduled resource can be made immediately available to another user. This avoids the peak variability of noise rise, when high data rates have been allocated to users running bursty high data rate applications.

With current proposals, the packet scheduler is located in the RNC and is therefore limited in its ability to adapt to the instantaneous traffic. This is because of bandwidth constraints on the RRC (radio resource control) signalling interface between the RNC and the user equipment. To accommodate the variability, the packet scheduler must be conservative in allocating up link power to take into account the influence from inactive users in the following scheduling period. This proposal is spectrally inefficient for high allocated data rates and long release time of values.

There are also current proposals which have the Node B taking care of the allocated up link resources with EDCH. For the transmission of data, it is proposed that the user equipment selects a transport format combination TFC that suits the amount of data to be transmitted in its RLC radio link control buffer, subject to constraints on the maximum transmission power of the user equipment and the maximum allowed TFC. If needed, the user equipment can request a high bit rate and the Node B can decide whether or not to grant additional resources. The Node B may also adjust the resources allocated to all user equipment according to the cell load.

Signalling is required to support the Node B scheduling. For the up link, the user equipment requests and/or status needs to be transmitted to Node B. For example, the user equipment tells Node B that it would like additional resources to be allocated or the user equipment signals to Node B how much data it has in its buffer so that the Node B can assess how much resource it needs. As far as the downlink is concerned, the Node B needs to send scheduling commands, for example, grant additional resources.

For downlink, two signalling methods are possible. One known method is for the Node B to directly signal to the user equipment, the index of the highest TFC allowed (hereinafter referred to as $TFC_{max}$).

An alternative method is a step wise method where the Node B signals UP/DOWN/KEEP commands for changing the index of the highest TFC allowed. This signalling is called rate grant (RG) and its size can be as low as one bit (an UP command and a DOWN command only) or two bits (an UP command, a DOWN command and a KEEP command).

The absolute signalling method requires a larger signalling overhead compared to the stepwise method. The step wise signalling method can prevent an sudden increase of noise but if a large amount of data abruptly occurs in the user equipment while transmitting at a low data rate, the step wise rate increase will result in long ramp up times to reach the required data rate. Whilst this is not a particular issue when the cell load is high, it is one when the cell load is low. This is because the user equipment has to wait for a long time although it could have been allowed to use the high data rate right away. Additionally, when the cell load becomes critical it may be beneficial to quickly decrease the allocated resources. The step wise rate decrease does not allow this.

Since packet data applications are typically bursty in nature with large variations in their resource requirements, adjusting the user equipment data rate quickly can increase the overall system performance especially when the cell's load is low.

In the 3GPP document R1 040683—enhanced uplink scheduling it is proposed to use a "busy indicator" to indicate whether the cell is fully loaded or not. This is in combination with an indication of the maximum resource the user equipment is allowed to consume in the uplink. If the busy indicator is not set, the user equipment may use resources up to the maximum resource indication transmitted by the cell. On the other hand, if the busy indicator is set, the cell is fully loaded and the user equipment is not allowed to start transmitting using resources higher than a lower resource limit.

It has also been proposed by the present applicant in U.S. Ser. No. 10/764,143 filed 23 January that when the user equipment initial data rate is low or zero, the downlink scheduling related signalling is interpreted differently or even signalled differently than when the user equipment initial data rate is higher. The method proposed has the following steps:

Initially, the user equipments allowed data rate is low—low being a predetermined TFC or anything below that.

The user equipment asks for a higher data rate by sending a "data rate increment request" bit to the Node B.

If the node accepts the request, it responds with "data rate grant up" bit. The downlink signalling is interpreted differently by the user equipment due to the initial low data rate than it would be if the data rate was higher i.e. the resulting data rate can be more than one step higher than the initial data was. This how much "more than one step" could for example be signalled by a higher layers when setting up the connection.

SUMMARY OF THE INVENTION

It is an aim of embodiments of the present invention to provide an improved method of controlling the data rate and in particular and not exclusively in the enhanced dedicated channel of a UMTS system using a RG method.

According to a first aspect of the present invention, there is provided a method of controlling communication between two nodes in a communication system, said method comprising the steps of providing a set of values for controlling communication between said two nodes, providing information relating to traffic conditions; providing a command for controlling communication; and selecting one of said set of values in dependence on said provided information, said command and mapping information providing a mapping between said traffic condition information and information relating to said values.

According to a second aspect of the present invention, there is provided a node arranged to communicate with a further node, said node comprising a memory for receiving a set of values for controlling communication between said two nodes, a processing unit for receiving information relating to traffic conditions and a command for controlling communication, and for selecting one of said set of values in dependence on said provided information, said command and mapping information providing a mapping between said traffic condition information and information relating to said values.

According to a third aspect of the present invention, there is provided a node arranged to provide controlling information to another node, said node comprising a first unit for sending to said another node a set of values for controlling communication between said two nodes, a second unit for sending information to said another node relating to traffic conditions and a third unit for sending a command for controlling communication.

BRIEF DESCRIPTION OF THE DRAWINGS

For a better understanding of the present invention and as to how the same may be carried into effect, reference will now be made by way of example only to the accompanying drawings in which.

DESCRIPTION OF THE PREFERRED EMBODIMENTS

Embodiments of the invention are described herein by way of reference to particular example scenarios. In particular, the invention is described in relation to elements of a universal mobile telecommunication system (UMTS).

Figure 1:
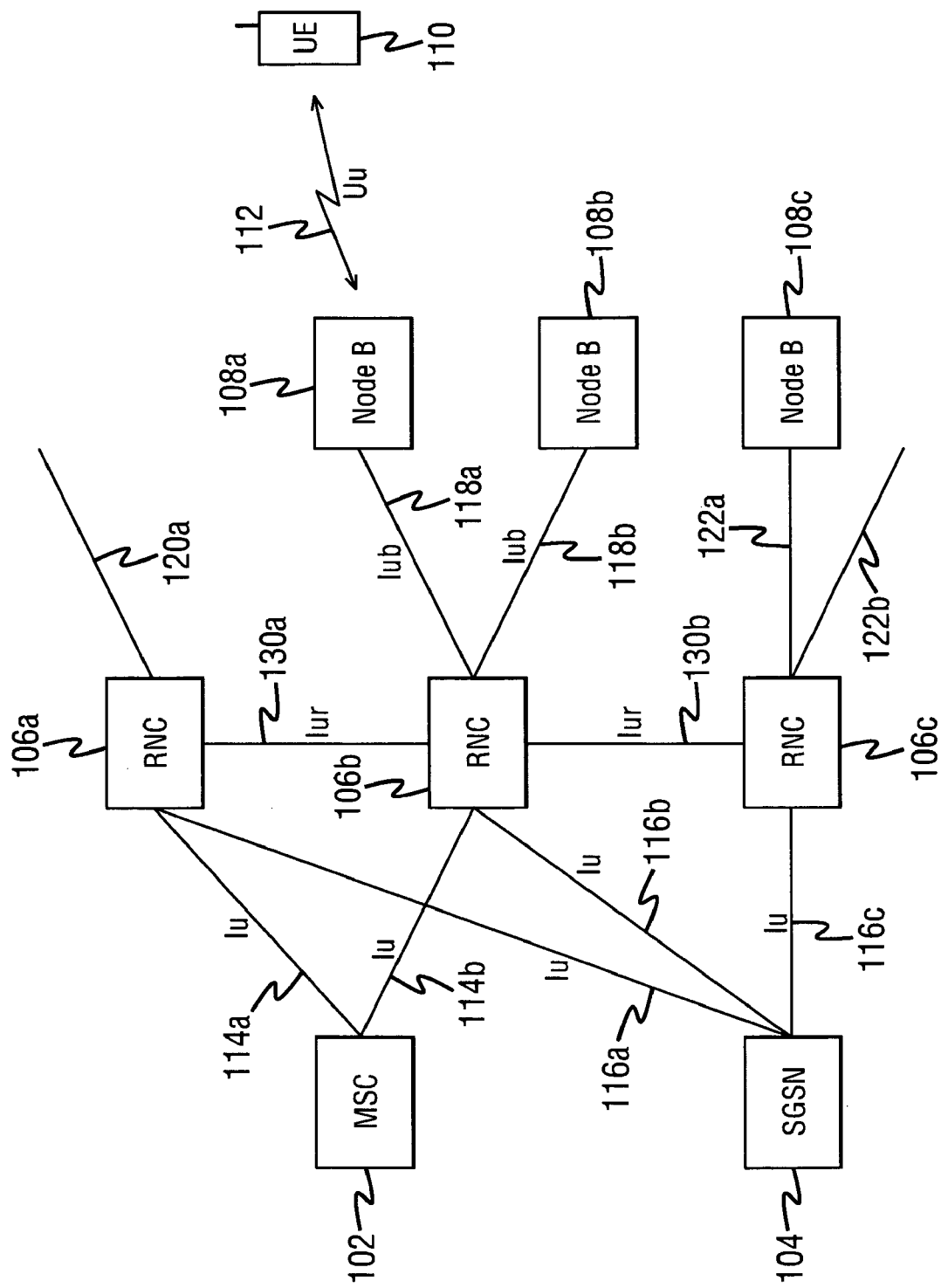
FIG. 1 illustrates elements of a radio access network in which embodiments of the preset invention may be implemented.

In FIG. 1, there is illustrated those typical elements of a UMTS system necessary for understanding embodiments of the present invention. The implementation of a UMTS system will be well known to one skilled in the art. As such, the system is not described in detail herein, but only sufficient elements shown and described as it necessary for an understanding of embodiments of the present invention.

Referring to FIG. 1, an example UMTS system typically includes a mobile switching centre (MSC) 102, a serving GPRS support node (SGSN) 104, a plurality of radio network controllers (RNC) 106a, 106b, 106c, a plurality of Node Bs 108a, 108b, 108c and at least one user equipment (UE) 110.

In practice, the MSC functionality may be provided by an MSC server (MSS) and a media gateway MGW.

As is known in the art, the at least one user equipment 110 connects with one of the Node Bs, for example Node B 108a over a radio interface 112, known in the 3GPP UMTS system as a $U_u$ interface.

Each Node B is connected to at least one RNC via an $I_{ub}$ interface. The RNC 106b connects to the Node Bs 108a and 108b via $I_{ub}$ interfaces 118a and 118b respectively and possibly to one or more other Node Bs. The RNC connects to the Node B 108c via the $I_{ub}$ interface 122a and to one or more other Node Bs via one or more other $I_{ub}$ interfaces such as interface 122b. The RNC connects to one or more Node Bs via one or more $I_{ub}$ interfaces, such as interface 120a. Various RNCs may connect to various Node Bs as known in the art.

The RNCs themselves are interconnected via $I_{ur}$ interfaces. In FIG. 1, it is shown that the RNC 106a is connected to the RNC 106b via an $I_{ur}$ interface 130a, and the RNC 106b is connected to the RNC 106c via an $I_{ur}$ interface 130b. The RNC 106a and 106c may similarly be interconnected via an $I_{ur}$ interface. The various RNCs may be interconnected via $I_{ur}$ interfaces. Each of the RNCs in the UMTS system is connected to one or more MSCs or SGSNs via an $I_u$ interface. In the example of FIG. 1 the MSC 102 is connected to the RNC 106a and 106b via respective $I_u$ interfaces 114a and 114b, and the SGSN 104 is connected to the RNCs 106a, 106b and 106c via respective $I_u$ interfaces 114a, 114b and 114c.

The enhanced DCH uplink transport channel is a channel for transporting traffic from user equipment to a Node B via the radio interface $U_u$, and for transporting traffic from a Node B to an RNC and between RNCs on the $I_{ub}$ interface or the $I_{ur}$ interface.

Figure 2:
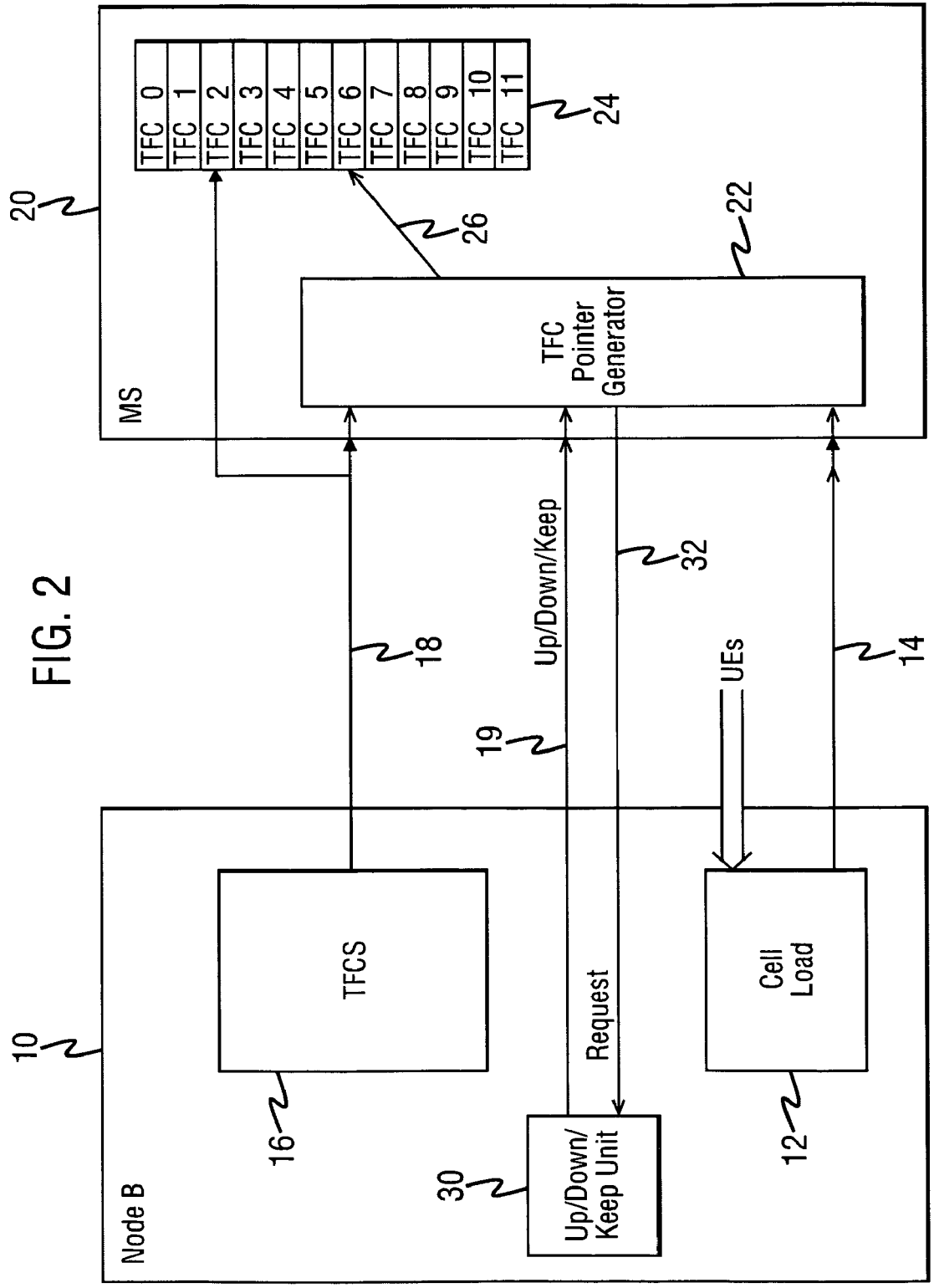
FIG. 2 schematically shows a Node B and user equipment embodying the present invention.

Reverence is made to FIG. 2 which schematically shows a Node B embodying the present invention and a user equipment or mobile station embodying the present invention.

The Node B 10 has a cell load unit 12. The cell load unit 12 is arranged to determine the cell load. In this embodiment of the present invention, the cell load is determined on the basis of the amount of traffic received by Node B 10 from the user equipment communicating with that node. It should be appreciated that in alternative embodiments of the present invention, the cell load may be calculated completely or at least partially by other entities in the system such as for example, the RNC. Node B 10 is arranged to send a signal 14 to the mobile station giving an indication of the cell loading. It should be appreciated that the cell loading information is in respect of the up link direction. In alternative embodiments of the present invention, the cell loading information may also or alternatively take into account the down load cell loading.

The Node B 10 also has a transport format combination set (TFCS) 16 usually provided by the RNC. During E-DCH set up, the user equipment is arranged to receive a TFCS from the TFCS unit 16 via connection 18. The TFCS UNIT 16 defines the N different TFCs where $TFC_0$ is the lowest data rate that the UE can use and $TFC_{n-1}$ the highest one. TFC is the allowed combination of transport format(s) of the different transport channels that are multiplexed together on physical channel(s). The TFCS unit 16 also provides a mapping between step size and cell load and this is transmitted to the user equipment. In one modification to the invention, the mapping can be fixed so there is no need for the Node B to transmit the mapping and for the UE to receive it Consider the following example. Six levels are used for the cell load where level zero means a low cell load and level 5 means a high cell load. One example of mapping is then cell load level:

Cell load level 0, TFC step size is 7
Cell load level 1, TFC step size is 5,
Cell load level 2, TFC step size is 4, Cell load level 3, TFC step size is 3,
Cell load level 4, TFC step size is 2,
Cell load level 5, TFC step size is 1.

In this example, it can be seen that when the cell load is low, for example zero, a large TFC step is allowed—7. Conversely when a cell load is high, for example 5, only a small step size is possible—1.

Thus, Node B 10 is arranged to send the following information to the mobile station:
  the cell load condition;
    a set of TFC's, with each TFC having a different data rate; and
    a mapping between the step size and the cell loading (if this varies).

It should be appreciated that two connections are shown between Node B 10 and the mobile station 20. However, this is schematic and the connections will both form part of the radio interface between the Node B 10 and the mobile station 20.

Additionally, Node B 10 will also provide the UP, DOWN or KEEP command by unit 30. This is in response to UE requests and/or status information 32. This request or status may take the form of the UE requesting additional resources or the UE signalling to Node B how much data it has in its buffer so that the unit 30 can assess how much resource it needs.

The user equipment 20 will now be described. The cell load information is received by a TFC pointer generator 22. The TFC pointer generator also receives the mapping information between the step TFC step size and the cell load and the UP/DOWN/KEEP command. The TFCs forming part of the TFCS are received by a TFC store 24 which stores the TFCs. In a preferred embodiment of the present invention, the TFC information is stored in a table along with the associated data rate. The TFC that is used will be dependent on the position of the pointer 26 which is generated by the TFC pointer generator 22.

The TFC pointer generator 22 is arranged to control the position of the pointer. The TFC pointer generator will use the mapping between the step size and the cell load along with the current cell loading information and the UP/DOWN/KEEP co to control the position of the pointer.

Depending on the UP/DOWN/KEEP signal and the cell load information, a determination is made as to whether or not the TFC is to be kept the same, decreased or increased. The cell load level will determine the TFC step size.

For example, if the cell load is 3 and the user equipment has received an UP command, it is allowed to increase its $TFC_{max}$ by 3. In other words, if the pointer is currently pointing to TFC2, then the new TFC will be TFC5.

Embodiments of the present invention can be used to ramp up or ramp down the resources. Effective step size is used by the user equipment to adjust the TFC max.

For ramping down resources, it may be beneficial to reverse the logic:

When the cell load is high, the step size is high, when the cell load is low, the step size is low. This allow for quickly reducing allocated resources when the cell load becomes critical. Thus, in one embodiment of the present invention, the TFCS unit 16 will also provide a possible mapping for when the power is to be reduced. Again the reverse mapping can also be fixed so there is no need for the Node B to transmit it and for the UE to receive it It should be appreciated that in embodiments of the present invention, different user equipment are able to have different TFCS. Thus, it is possible for them to have different step sizes allowed for the same cell load, if the mapping is not fixed. In other words, the mapping between the cell load and the step size is allowed to vary from one user equipment to another. For instance, two steps for one user equipment could correspond to a data rate increase of a few hundreds of kilo bits while for another user equipment, two steps could correspond to a few kilo bits per second only.

The meaning or unit of the cell load information is not particularly critical so long as the user equipment is able to translate them into a step size.

Figure 3:
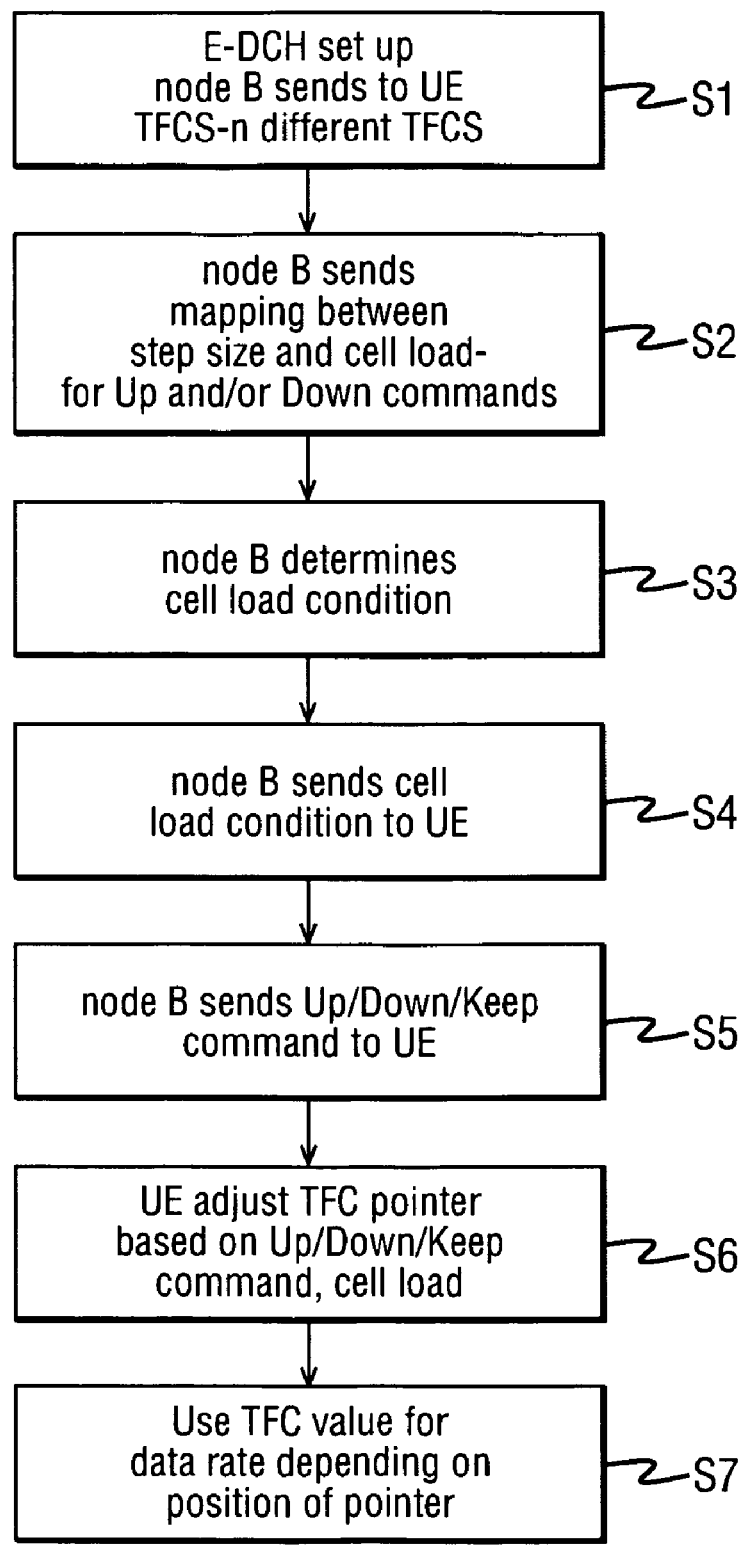
FIG. 3 shows a flow chart illustrating a first method embodying the present inventions.

Reference is made to FIG. 3 which shows a flow chart of the method steps carried out in embodiments of the present invention.

In step S1, the E-DCH channel set up takes place. Node B sends to the user equipment a TFCS with n different TFCs and associated data rates.

In step S2, Node B sends the mapping between the step size and the cell load. In preferred embodiments of the present invention, the mapping for the cell size and the cell load is sent for both up and down commands. This is an optional step as discussed previously.

In step S3, Node B determines the cell load condition. This, is optional if the cell load condition is determined elsewhere.

In step S4, Node B broadcasts a cell load condition to the user equipment.

In step S5, Node B sends the UP/DOWN/KEEP command to the user equipment.

In step S6, the user equipment adjusts, the TFC pointer based on the UP/DOWN/KEEP command and the cell load (taking into account the received mapping information).

In step S7, the TFC value indicated by the position of the pointer is used to set the data rate with which the data is sent from the user equipment to the Node B.

It should be appreciated that the order of steps 1 and 2 can be reversed. In some embodiments of the present invention, steps 1 and 2 can combined.

Step S3, may not be carried out by the Node B but may be instead carried out either by another entity or by Node B in combination with another entity.

In some embodiments of the present invention, Node B may only send an up or down command.

Step S5, may for example occur before step 4.

One modification to the embodiment described in relation to FIGS. 2 and 3 will now be described. In this implementation, a cost is associated with every TFC. There are two alternatives: 1) the possible TFCs are fixed in specifications and for each of them a cost is defined so that the UE and Node B always know the cost of a TFC; 2) a rule is defined to calculate the cost from the TFC (e.g. based on data rate) so that the UE and Node B always know the cost of a TFC. In both cases, the cost does not need to be signalled which reduces the signalling overhead. However in some embodiments of the invention the cost may be signalled.

Consider the following example. Six levels are used for the cell load where level zero means a low cell load and level five means a high cell load. A possible mapping is then (for an UP signal):

| Cell Load | Allowed Cost Increase |
|---|---|
| 0 | 7 |
| 1 | 6 |
| 2 | 5 |
| 3 | 4 |
| 4 | 2 |
| 5 | 1 |

In this example, it can be seen that when the cell load is low for example 0, a large cost increase is allowed and in this example is 7. Conversely when the cell load is high, for example 5, only a small increase is possible.

The effective size to be used by the user equipment to adjust $TFC_{max}$ when granted additional resources depends on the cell load and the cost increase. Using the same example figures, if the cell load is 3 and the user equipment has received an UP command it is allowed to increase its $TFC_{max}$ as long as the increase is not more than 4. For example, if the TFC is defined as follows:

$TFC_0$—cost 1
$TFC_1$—cost 2
$TFC_2$—cost 3
$TFC_3$—cost 4
$TFC_4$—cost 15
$TFC_5$—cost 16

If the TFC used was $TFC_4$ then the user equipment will be allowed to start using $TFC_5$ because the cost increase 1 is less than the maximum allowed 4. If the TFC in use were $TFC_2$, the user equipment would not be allowed to use $TFC_3$ because the cost increase 7 is more than the maximum allowed. However, since the user equipment was granted the additional resources by the Node B anyway, for example an up command was received, a default behaviour in that case could be that the user equipment is always allowed to start using the next TFC by default.

In embodiments of the present invention it is possible to apply the same principle to ramp down. The effective allowed cost decrease to be used by the user equipment to adjust the $TFC_{max}$ when its resources are reduced (DOWN link command) depends on the cell load. For ramping down resources, it may be beneficially to reverse the logic. When the cell load is high, the cost decrease is high. When the cell load is low, the cost decrease is low. This allows for quickly reducing allocated costs when the cell load becomes critical.

The second embodiment of the present invention allows for more advance control of the $TFC_{max}$ and takes into account the fact that the gap between consecutive TFCs in the TFCS may not be homogenous (the date rate increase from one TFC to another may not be constant across the TFCS). The implementation required for the second embodiment may be slightly different from that shown in FIG. 2. The TFC pointer generator 22 could be replaced by a processor which would then use the TFC table as a store of information to determine whether or not the TFC can be increased or not.

It should be appreciated that the embodiment described in relation to FIG. 2 can of course be replaced by any other suitable embodiment. For example, in the first embodiment, a processor could also be used to determine which TFC is to be used.

In embodiments of the present invention, a pointer is typically a data object used by executable code to point to a location and memory where the value of another data object is stored. However, the term pointer should be broadly understood as meaning any indicator or a value of a data object corresponding to the rate.

In some embodiments of the present invention, the concept of a pointer and a table may be replaced by a processor or the like.

Embodiment of the present invention may be implemented as software or firmware for execution by a processor or processors in respect of different pieces of equipment. Embodiments of the present invention may be provided as a computer program product including a computer readable storage structure embodying computer program code, for example, software or firmware, for execution by a computer processor.

In embodiments of the present invention, Node B may be considered to be an network access point, being a point at which a user terminal such as user equipment or mobile terminal accesses the network. In general, the radio network controller may be considered to be a network access controller being an element which controls network access. Thus, embodiments of the present invention may have broader application not only for E-DCH from the mobile station to the user equipment but also for channels between the Node B and the user equipment. Embodiments of the present invention may also be embodied in systems other than UMTS systems. Those systems may be wired or wireless systems.

The invention is being described herein by way of reference to particular non limiting examples. One skilled in the art will understand the general applicability of the invention. The scope of protection afforded by the invention is defined in the appended claims.

The invention claimed is:

1. An apparatus, comprising:
at least one processor; and
a memory including computer program code,
the memory and the computer program code configured to, with the processor, cause the apparatus at least to
store a set of values to control communication between two nodes,
receive information relating to traffic conditions, wherein said traffic conditions comprises cell loading, and a command to control communication, and
select one value from said set of values based on said received information, said command and mapping information providing a mapping between said received information and one of an allowed step size for said set of values and an allowed cost change,
wherein said command indicates whether the one value is to increase, decrease or stay the same.

2. The apparatus as claimed in claim 1, wherein said apparatus is user equipment.

3. The apparatus as claimed in claim 1, wherein said memory comprises a table.

4. The apparatus as claimed in claim 1, wherein said memory and the computer program code are further configured to, with the processor, cause the apparatus at least to control a pointer configured to point to a location in said memory.

5. The apparatus as claimed in claim 1, wherein said memory and the computer program code are further configured to, with the processor, cause the apparatus at least to receive mapping information.

6. The apparatus as claimed in claim 1, wherein said set of values are transport format combination values.

7. The apparatus of claim 1, wherein mapping information and said command provide a mapping between said information relating to traffic conditions and information relating to said set of values.

8. The apparatus of claim 1, wherein the memory and the computer program code are further configured to, with the processor, cause the apparatus at least to receive the set of values to control communication between said two nodes.

9. An apparatus, comprising:
at least one processor; and
a memory including computer program code,
the memory and the computer program code configured to, with the processor, cause the apparatus at least to
send information to a node relating to traffic conditions wherein said traffic conditions comprises cell-loading, and
send a command to control communication, wherein said command indicates whether a value from a set of values based on said sent information and mapping information providing a mapping between said sent information and one of an allowed step size for said set of values and an allowed cost change and to control communication between said apparatus and said node is to increase, decrease or stay the same.

10. The apparatus as claimed in claim 9, wherein said apparatus is a node B.

11. The apparatus as claimed in claim 9, wherein said set of values are transport format combination values.

12. The apparatus of claim 9, wherein the memory and the computer program code are further configured to, with the processor, cause the apparatus at least to send to said another node said set of values to control communication between said apparatus and said another node.

13. A system, comprising:
two nodes configured to communicate, a first one of said nodes comprising a memory configured to store a set of values to control communication between said first node and a second node;
a processor, of the first one of the nodes, configured to receive information relating to traffic conditions, wherein the traffic conditions comprises cell-loading, and a command to control communication, and configured to select one value from said set of values based on said received information, said command and mapping information providing a mapping between said received information and one of an allowed step size for said set of values and an allowed cost change; and
a second one of said nodes comprising, a first transmitter configured to send said information to said first node relating to traffic conditions, wherein the traffic conditions comprises cell-loading, and a second transmitter configured to send said command to control communication,
wherein said command indicates whether the one value is to increase, decrease or stay the same.

14. A method, comprising:
providing, by a second one of two nodes in a communication system to a first one of the two nodes,
information relating to traffic conditions, wherein the traffic conditions comprises cell-loading, and
a command to control communication,
wherein said command indicates whether a value from a set of values based on said sent information and mapping information providing a mapping between said received information and one of an allowed step size for said set of values and an allowed cost change and to control communication between said first one of the two nodes and said second one of the two nodes is to increase, decrease or stay the same.

15. The method of claim 14, further comprising:
providing said set of values to control communication between said two nodes.

16. The method as claimed in claim 15, wherein said providing said set of values comprises providing a transport format combination set.

17. The method as claimed in claim 16, further comprising: associating a cost with each of said set of values.

18. The method as claimed in claim 17, further comprising: carrying out, by a second one of said two nodes, at least one of the providing said set of values and providing said information.

19. The method as claimed in claim 14, wherein the second node of said nodes is a node B.

20. A method, comprising:
storing, at a first one of two nodes in a communication system, a set of values to control communication between the two nodes;
receiving, at said first one of two nodes in a communication system, information relating to traffic conditions, wherein the traffic conditions comprises cell-loading, and a command to control communication; and
selecting at the first one of the two nodes one value from a set of values based on said received information, said command and mapping information providing a mapping between said received information and one of an allowed step size for said set of values and an allowed cost change,
wherein said command indicates whether the one value is to increase, decrease or stay the same.

21. The method of claim 20, further comprising:
using mapping information and said command to map said information relating to traffic conditions comprising cell-loading and information relating to said set of values.

22. The method as claimed in claim 20, wherein said selecting comprises controlling a pointer to point at the one value from said set of values.

23. The method as claimed in claim 20, further comprising:
using a first set of mapping information to increase resource between said nodes; and
using a second set of mapping information to reduce resource between said two nodes.

24. The method as claimed in claim 20, further comprising:
using said one value selected in said selecting to control a data rate between said two nodes.

25. The method as claimed in claim 20, wherein said first one of said nodes is user equipment.

26. The method as claimed in claim 20, further comprising:
associating a cost with each of said set of values.

27. An apparatus, comprising:
a memory means for storing a set of values for controlling communication between two nodes; and
a processing means for receiving information relating to traffic conditions, wherein the traffic conditions comprises cell-loading, and a command for controlling communication, and for selecting one value from said set of values based on said received information, said command and mapping information providing a mapping between said received information and one of an allowed step size for said set of values and an allowed cost change,
wherein said command indicates whether the one value is to increase, decrease or stay the same.

28. A non-transitory computer-readable storage medium encoded with instructions configured to control a processor to perform a process, the process comprising:
storing, at a first one of two nodes in a communication system, a set of values to control communication between the two nodes;
receiving, at said first one of two nodes in a communication system, information relating to traffic conditions, wherein the traffic conditions comprises cell-loading, and a command to control communication; and
selecting at the first one of the two nodes one value from a set of values based on said received information, said command and mapping information providing a mapping between said received information and one of an allowed step size for said set of values and an allowed cost change,
wherein said command indicates whether the one value is to increase, decrease or stay the same.

29. A non-transitory computer-readable storage medium encoded with instructions configured to control a processor to perform a process, the process comprising:

provinding, by a second one of two nodes in a communication system to a first one of the two nodes, information relating to traffic conditions, wherein the traffic conditions comprises cell-loading, and a command to control communication, wherein said command indicates whether a value from a set of values based on said sent information and mapping information providing a mapping between said received information and one of an allowed step size for said set of values and an allowed cost change and to control communication between said first one of the two nodes and said second one of the two nodes is to increase, decrease or stay the same.

* * * * *